United States Patent
Makhsous et al.

(10) Patent No.: US 7,322,651 B2
(45) Date of Patent: Jan. 29, 2008

(54) SEAT SUBPORTION ADJUSTABLE IN RELATIVE HEIGHT AND/OR ANGLE AND BACKREST ADJUSTABLE IN SHAPE BASED ON USER CONTACT PRESSURE

(76) Inventors: Mohsen Makhsous, 6101 N. Sheridan Rd., #40D (East Point), Chicago, IL (US) 60660; Fang Lin, 5455 N. Sheridan Rd., Unit 3211, Chicago, IL (US) 60640; Ellis K. Nam, 441 W. Armitage Ave., Chicago, IL (US) 60614

( * ) Notice: Subject to any disclaimer, the term of this patent is extended or adjusted under 35 U.S.C. 154(b) by 411 days.

(21) Appl. No.: 10/856,612

(22) Filed: May 28, 2004

(65) Prior Publication Data

US 2005/0264069 A1 Dec. 1, 2005

(51) Int. Cl.
*A47C 4/54* (2006.01)
*A47C 7/14* (2006.01)
*A47C 7/50* (2006.01)
*A47C 31/00* (2006.01)

(52) U.S. Cl. ............... 297/284.6; 297/284.9; 297/423.26; 297/217.2; 297/217.3

(58) Field of Classification Search ............. 297/284.9, 297/284.3, 284.4, 284.6, 423.26, 217.3, 452.63, 297/217.2, 452.41
See application file for complete search history.

(56) References Cited

U.S. PATENT DOCUMENTS

| | | | |
|---|---|---|---|
| 4,676,550 A | 6/1987 | Neve De Mevergnies | |
| 4,728,149 A | 3/1988 | Neve de Mevergnies | |
| 4,787,676 A | 11/1988 | Neve de Mevergnies | |
| 4,966,413 A * | 10/1990 | Palarski | 297/330 |
| 5,082,326 A * | 1/1992 | Sekido et al. | 297/284.6 |
| 5,127,708 A * | 7/1992 | Kishi et al. | 297/284.1 |
| 5,263,765 A | 11/1993 | Nagashima et al. | |
| 5,320,409 A * | 6/1994 | Katoh et al. | 297/284.6 |
| 5,659,910 A * | 8/1997 | Weiss | 5/618 |
| 5,765,910 A | 6/1998 | Larkin et al. | |
| 5,975,641 A * | 11/1999 | Delesie | 297/452.63 |
| 6,007,151 A | 12/1999 | Benson | |

(Continued)

OTHER PUBLICATIONS

M. Makhsous, F. Lin, R. Hendrix, M. Hepler, L. Zhang, PhD, et al.; Sitting with Adjustable ischial and Back Supports: Biomechanical Changes; Jun. 2003; 10 pgs.; vol. 28, No. 11, pp. 1113-1122; Lippincott Williams & Wilkins; USA.

(Continued)

*Primary Examiner*—Milton Nelson, Jr.
(74) *Attorney, Agent, or Firm*—Wood, Phillips, Katz, Clark & Mortimer; Robert J. Brill

(57) ABSTRACT

A seat of an apparatus in one example comprises a front subportion and a rear subportion that is adjustable in height and/or angle relative to the front subportion. A backrest of the apparatus in one example is adjustable in shape. Based on a user contact pressure against one or more portions of the seat and/or one or more portions of the backrest, the rear subportion of the seat and the backrest are adjustable between: a first height and/or angle of the rear subportion of the seat and a first shape of the backrest; and a second height and/or angle of the rear subportion of the seat and a second shape of the backrest.

20 Claims, 3 Drawing Sheets

U.S. PATENT DOCUMENTS

| | | |
|---|---|---|
| 6,033,021 A | 3/2000 | Udo et al. |
| 6,056,079 A | 5/2000 | Cech et al. |
| 6,068,280 A | 5/2000 | Torres |
| 6,220,667 B1 | 4/2001 | Wagner |
| 6,578,916 B2 * | 6/2003 | Longhi et al. ........... 297/284.3 |
| 6,588,792 B1 | 7/2003 | Koerlin et al. |
| 6,701,558 B2 * | 3/2004 | VanSteenburg ................ 5/737 |
| 6,715,784 B2 | 4/2004 | Koerlin et al. |
| 6,910,736 B2 * | 6/2005 | White ..................... 297/284.3 |

OTHER PUBLICATIONS

M. Makhsous, J. Patel, F. Lin, L. Zhang; Sitting Pressure in a Wheelchair with Adjustable ischial and Back Supports; Poster Presentation; Jun. 19-23, 2003; 15 pgs; Atlanta, GA.

M. Makhsous, F. Lin, E. Nam, S. Taylor; Preventing Pressure Ulcers Using a New Sitting Concept; Nov. 30, 2003; National Institute of Health; Chicago, IL.

* cited by examiner

SEAT SUBPORTION ADJUSTABLE IN RELATIVE HEIGHT AND/OR ANGLE AND BACKREST ADJUSTABLE IN SHAPE BASED ON USER CONTACT PRESSURE

TECHNICAL FIELD

The invention relates generally to seats and backrests and more particularly to adjustment of seats and backrests.

BACKGROUND

People with occupations that require long periods of sitting and people who use wheelchairs are often affected by low back pain, poor blood circulation of the lower body, and pressure sores. Low back pain associated with extended sitting is likely caused by poor sitting posture which flattens the natural curvature of the spine and increases the stress on back muscles. Sitting related pressure sores are primarily caused by concentrated pressure on a posterior area of a hip bone, for example, ischial tuberosities or coccyx, of a person who sits extensively. This concentration of pressure can cause ischial or coccyx pressure sores over time. Adjustment of the seating position of the user to redistribute contact pressure of the user promotes an increase in blood circulation, a reduction in risk of pressure sores, and a promoted healing process of established pressure sores.

Users are advised that during extended sitting they should occasionally perform "push-ups" in their chair to adjust their seating position and reduce contact pressure that may otherwise cause pressure sores. Users of wheelchairs may have a disability or lack strength that prevents them from performing the push-up or adjusting their seating position themselves. They may also be unable to notice when poor circulation and sustained elevated pressures give rise to pressure sores.

Thus, a need exists for a seat and backrest that promote an increase in circulation. A further need exists for the seat and backrest to promote a reduction in contact pressure build-up for a user. A still further need exists for the seat and backrest to promote a restoration of the natural curvature of the spine for the user. Another need exists for the seat and backrest to promote a reduction in stress of the back muscles of the user. Yet another need exists for the seat and backrest to promote comfort for the user over extended periods of sitting.

SUMMARY

The invention in one implementation encompasses an apparatus. The apparatus comprises a seat and a backrest. The seat comprises a front subportion and a rear subportion that is adjustable in height and/or angle relative to the front subportion. The backrest is adjustable in shape. Based on a user contact pressure against one or more portions of the seat and/or one or more portions of the backrest, the rear subportion of the seat and the backrest are adjustable between: a first height and/or angle of the rear subportion of the seat and a first shape of the backrest; and a second height and/or angle of the rear subportion of the seat and a second shape of the backrest.

Another implementation of the invention encompasses a method. A backrest is adjusted between a first shape and a second shape based on a user contact pressure against one or more portions of the backrest and/or one or more portions of a seat. A rear subportion of the seat is adjusted between a first height and/or angle and a second height and/or angle relative to a front subportion of the seat based on the user contact pressure against the one or more portions of the backrest and/or the one or more portions of the seat.

A further implementation of the invention encompasses an article. The article comprises one or more computer-readable signal-bearing media. The article includes means in the one or more media for adjusting a backrest between a first shape and a second shape based on a user contact pressure against one or more portions of the backrest and/or one or more portions of a seat. The article includes means in the one or more media for adjusting a rear subportion of the seat between a first height and/or angle and a second height and/or angle relative to a front subportion of the seat based on the user contact pressure against the one or more portions of the backrest and/or the one or more portions of the seat.

DESCRIPTION OF THE DRAWINGS

Features of exemplary implementations of the invention will become apparent from the description, the claims, and the accompanying drawings in which:

DETAILED DESCRIPTION

Figure 1:
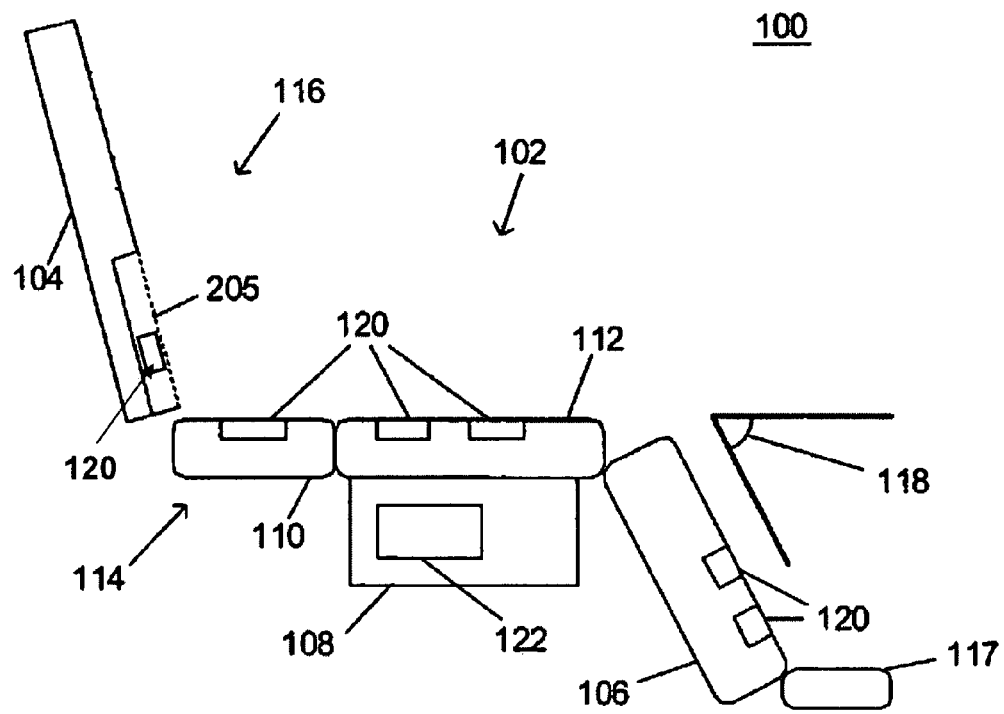
FIG. 1 is a representation of one implementation of an apparatus that comprises a seat, a backrest, a leg support, and a control component.

Turning to FIG. 1, an apparatus 100 in one example comprises one or more of a seat 102, a backrest 104, a leg support 106, and/or one or more control components 108. The seat 102 comprises a rear subportion 110 and a front subportion 112. The rear subportion 110 provides ischial support to a user (not shown). For example, the rear subportion 110 provides support to a posterior area of the user's buttocks. The rear subportion 110 in one example is adjustable in angle relative to the front subportion 112. For example, the rear subportion 110 can be tilted upward and/or downward about an axis 202 (FIG. 2) across an angle 204

Figure 2:
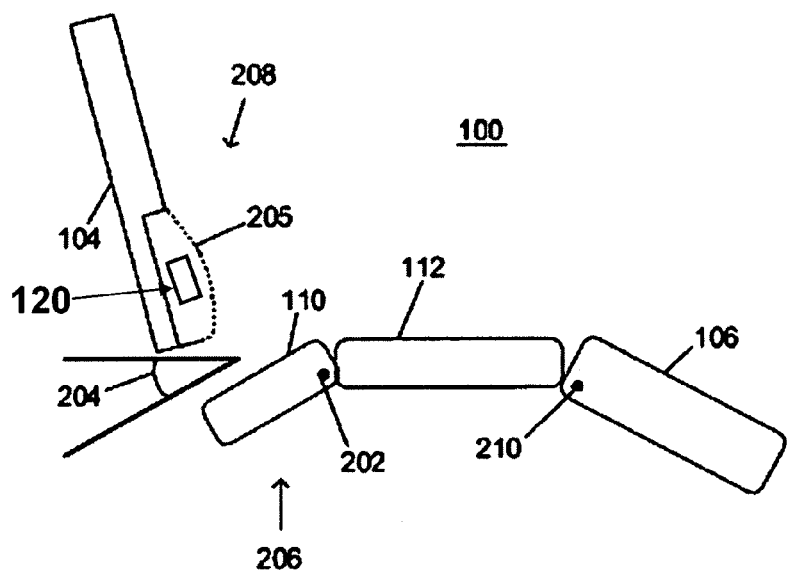
FIG. 2 is a representation of another implementation of the apparatus of FIG. 1, illustrating a rear subportion of the seat in an angled position.
Figure 3:
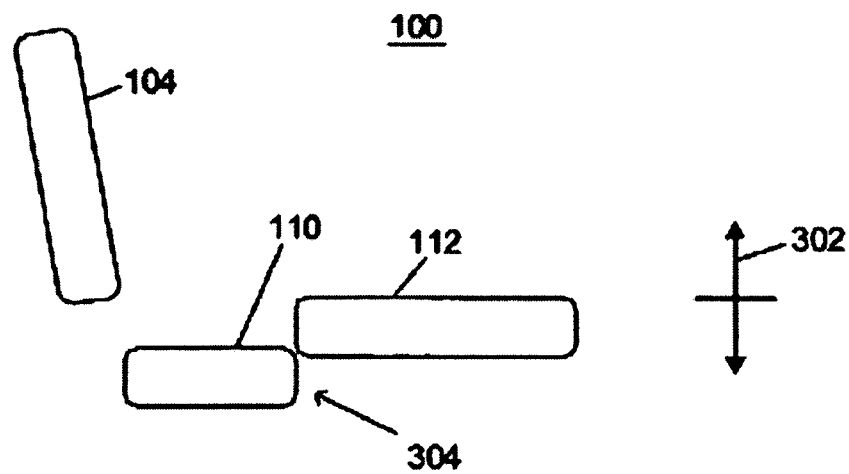
FIG. 3 is a representation of yet another implementation of the apparatus of FIG. 1, illustrating the rear subportion of the seat in a lowered position.

(FIG. 2). The rear subportion 110 in another example is adjustable in height relative to the front subportion 112. For example, the rear subportion 110 can be raised or lowered along a direction 302 (FIG. 3). In a further example, the rear subportion 110 both raises and lowers along the direction 302 and tilts about the axis 202. The rear subportion 110 in one example comprises one or more input components 120, as described herein. The seat 102, backrest 104, and leg support 106 in one example comprise a portion of a chair, wheelchair, and/or car seat.

The front subportion 112 provides thigh support to the user. The front subportion 112 in one example is adjustable across the angle 204 and/or an angle 118 relative to the rear subportion 110 and/or the leg support 106. The front subportion 112 in one example comprises one or more input components 120, as described herein.

The leg support 106 in one example comprises a foot support 117. The leg support 106 and/or the foot support 117 provide support for the legs and/or feet of the user. The leg support 106 in one example is adjustable in height and/or angle relative to the seat 102. The leg support 106 in one example pivots about an axis 210 to change the knee angle 118 of the user, for example, between approximately ninety degrees and twenty degrees. A change in the knee angle 118 of the user promotes a change in distribution of weight of the user against the seat 102. For example, reducing the knee angle 118 (i.e. raising the feet of the user) reduces a peak contact pressure of the user against the seat 102, as will be appreciated by those skilled in the art.

One or more of the seat 102, the backrest 104, and/or the leg support 106 in one example comprise one or more input components 120, for example, contact pressure sensors, air pressure sensors, temperature sensors, accelerometers, and/or clocks inputs. In one example, the seat 102, the backrest 104, and the leg support 106 comprise one or more contact pressure sensors. The contact pressure sensors provide a contact pressure against the seat 102 and/or backrest 104, for example, a contact pressure due to the user. Contact pressure sensors may also be located on a surface of an air bladder 205 (FIG. 2). In another example, the seat 102 and/or the backrest 104 comprise air pressure sensors for the air bladder 205. For example, the air pressure sensors measure the pressure within the air bladder 205. In yet another example, the seat 102 and the backrest 104 comprise one or more temperature sensors. The temperature sensors measure a dermal temperature of the user. The seat 102 and/or the backrest 104 in one example comprise accelerometers for measuring a vibration of the seat 102 and/or the backrest 104.

The control component 108 in one example is communicatively coupled with one or more of the seat 102, the backrest 104, and/or the leg support 106. For example, the control component 108 signals one or more of the seat 102 and/or the backrest 104 to cause an adjustment of the seat 102 and/or the backrest 104. The control component 108 in one example is communicatively coupled with one or more of the input components 120. In one example, the control component 108 causes an adjustment of one or more of the seat 102, the backrest 104, and/or the leg support 106 based on a user contact pressure against the seat 102, the backrest 104, and/or the leg support 106. For example, the control component 108 causes the adjustment to change an amount of ischial support provided to the user and/or change a distribution of contact pressure of the user, as described herein. In a further example, the control component 108 causes the adjustment of the seat 102, the backrest 104, and/or the leg support 106 based on one or more inputs from the input components 120. Exemplary inputs comprise the contact pressure of the user against one or more portions of the seat 102, the backrest 104, and/or the leg support 106, the dermal temperature of the user, the vibration of the seat 102 and/or the backrest 104, and a clock input. The control component 108 in one example comprises an instance of a recordable data storage medium 122, as described herein. The control component 108 in one example comprises a user interface screen for receiving manual inputs for adjustments from the user to position the seat 102, the backrest 104, and/or the leg support 106.

To change the amount of ischial support provided to the user, the control component 108 in one example adjusts the seat 102, the backrest 104, and/or the leg support 106. For example, the control component 108 adjusts the rear subportion 110 and/or the front subportion 112 to cause a change in a distribution of contact pressure between the user and the seat 102 and/or the backrest 104. The control component 108 changes the distribution of contact pressure to promote a reduction in pressure sores to the user, as will be appreciated by those skilled in the art.

Turning to FIG. 2, the rear subportion 110 in one example pivots about the axis 202 to adjust the angle 204 of the rear subportion 110 relative to the front subportion 112. The rear subportion 110 in one example comprises a hinge about the axis 202. The rear subportion 110 in one example comprises one or more of a lever arm, an electric motor, worm gear, jack, and/or a hydraulic system that cause the rear subportion 110 to pivot about the axis 202. The rear subportion 110 pivots about the axis 202, for example, between a position 114 and a position 206. In one example, the position 114 comprises a height of the rear subportion 110 along the direction 302 that is substantially the same as a height of the front subportion 112 along the direction 302. In a further example, the position 114 comprises an angle 204 of the rear subportion 110 that is substantially the same as an angle 204 of the front subportion 112. In the position 206, the angle 204 of the rear subportion 110 is approximately between ten to seventy degrees. The position 206 provides less ischial support to the user than the position 114, as will be appreciated by those skilled in the art.

Turning to FIG. 3, the rear subportion 110 in one example raises and/or lowers the height of the rear subportion 110 along the direction 302 from the position 114 to a position 304. For example, the rear subportion 110 lowers approximately three to ten centimeters along the direction 302. The rear subportion 110 in one example comprises one or more of a lever arm, an electric motor, worm gear, jack and/or a hydraulic system that cause the rear subportion 110 to raise and/or lower along the direction 302. The position 304 provides less ischial support to the user than the position 114, as will be appreciated by those skilled in the art.

Figure 4:
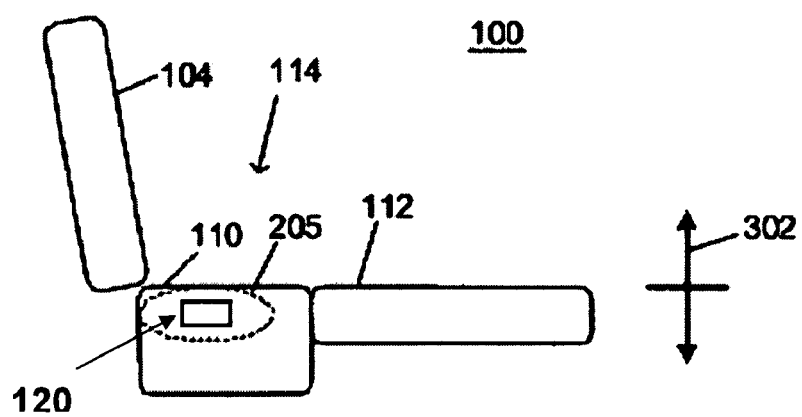
FIG. 4 is a representation of a further implementation of the apparatus of FIG. 1 where the rear subportion of the seat comprises an air bladder, illustrating a state in which the air bladder is inflated.
Figure 5:
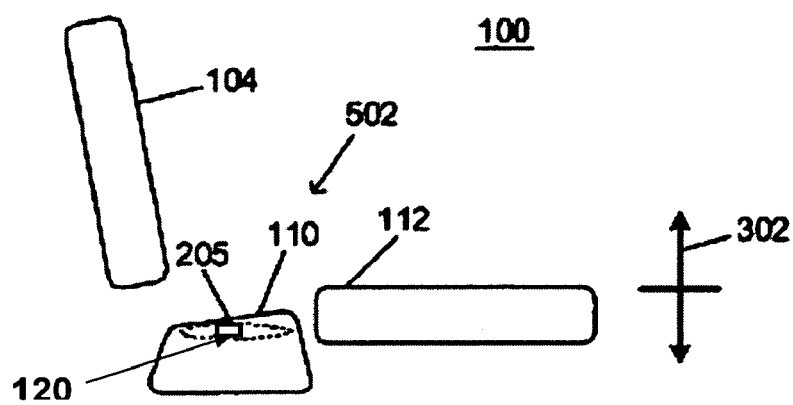
FIG. 5 is a representation of the implementation of the apparatus of FIG. 4, further illustrating a state in which the air bladder is deflated.

Turning to FIGS. 4-5, the rear subportion 110 in one example comprises one or more air bladders 205. The control component 108 in one example signals an air compressor to inflate and/or deflate the air bladders 205. The air bladder 205 of FIG. 4 is inflated such that the rear subportion 110 is in the position 114. The air bladder 205 of FIG. 5 is deflated such that the rear subportion 110 is in a position 502. The position 502 in one example comprises a height of the rear subportion 110 along the direction 302 approximately three to ten centimeters lower than the height of the front subportion 112 along the direction 302. The position 502 provides less ischial support to the user than the position 114, as will be appreciated by those skilled in the art.

Referring to FIGS. 1-2, the backrest 104 is adjustable in shape. In one example, the backrest 104 comprises a shape 116 that provides support for the user sitting on the seat 102 with the backrest 104 in an upright position. In another example, the backrest 104 comprises a shape 208 that provides increased lumbar support and stabilization of the pelvis for the user. For example, the backrest 104 expands to the shape 208 that is larger than the shape 116 to provide the increased lumbar support and stabilization of the pelvis. The backrest 104 in one example comprises one or more air bladders 205. For example, the air bladder 205 inflates to expand the backrest 104 from the shape 116 to the shape 208. The air bladder 205 deflates to change the backrest 104 from the shape 208 to the shape 116. In another example, the backrest 104 comprises one or more of a lever arm, an electric motor, worm gear, jack, and/or a hydraulic system that cause the backrest 104 to expand and/or contract between the shapes 116 and 208.

Figure 6:
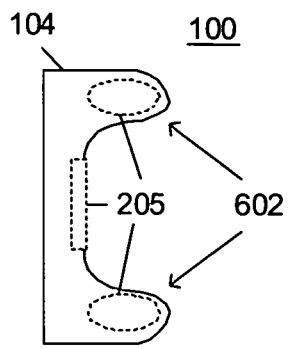
FIG. 6 is a top representation of the backrest of FIG. 1 where the backrest comprises one or more side bolsters with one or more air bladders, illustrating the air bladders in an inflated state.
Figure 7:
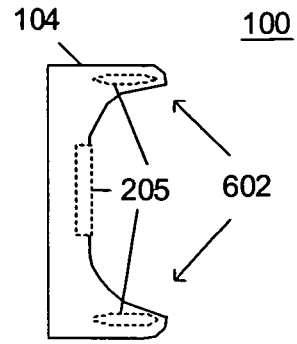
FIG. 7 is a top representation of the implementation of the apparatus of FIG. 6, illustrating the air bladders of the backrest in a deflated state.

Turning to FIGS. 6-7, the backrest 104 in one example comprises one or more side bolsters 602. The side bolsters 602 provide lateral and/or trunk support to the user. In a further example, the seat 102 and/or the leg support 106 comprise side bolsters 602 analogous to the backrest 104. The side bolsters 602 in one example comprise one or more air bladders 205. For example, the air bladders 205 inflate to provide additional lateral support to the user (FIG. 6), or deflate to reduce and/or remove lateral support (FIG. 7), as will be appreciated by those skilled in the art.

Figure 8:
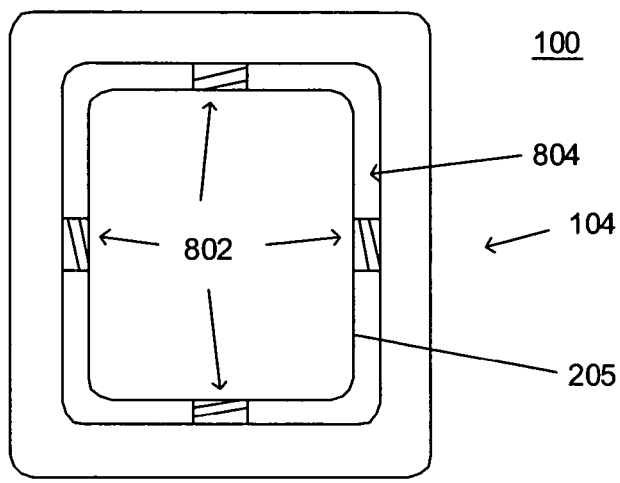
FIG. 8 is a representation of a still further implementation of the apparatus of FIG. 1, illustrating suspension components of the backrest.

Turning to FIG. 8, the backrest 104 in one example comprises one or more suspension components 802. The seat 102 and/or the leg support 106 in one example comprise suspension components 802 analogous to the backrest 104. Exemplary suspension components 802 comprise springs or elastic, compressible, and/or flexible material. The suspension components 802 in one example suspend one or more portions of the backrest 104, for example, the air bladder 205, within an aperture 804 of the backrest 104 to allow the air bladder 205 of the backrest 104 to oscillate in one or more directions. For example, the suspension components 802 allow the air bladder 205 to move with the spine of the user when the seat 102 and/or backrest 104 are jolted by an external force, such as a car seat when moving down a bumpy road or a wheelchair over a cracked sidewalk. Oscillation of the air bladder 205 increases mobility of the user's spine. For example, the suspension components 802 reduce whole-body vibration of the user, as will be appreciated by those skilled in the art.

Figure 9:
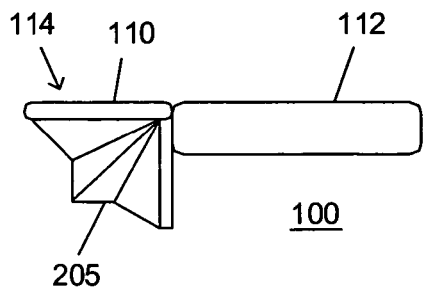
FIG. 9 is a representation of another implementation of the apparatus of FIG. 1 where the rear subportion of the seat comprises an air bladder, illustrating a state in which the air bladder is inflated.
Figure 10:
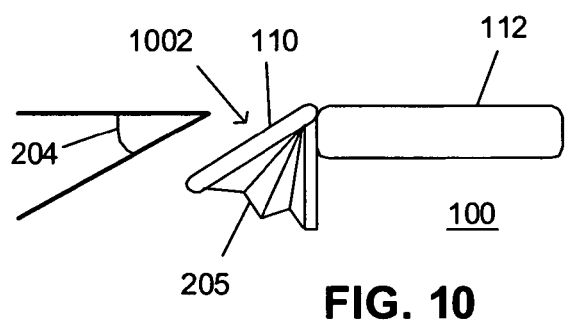
FIG. 10 is a representation of the implementation of the apparatus of FIG. 9, further illustrating a state in which the air bladder is deflated.

Turning to FIGS. 9-10, another implementation of the rear subportion 110 in one example comprises one or more air bladders 205. The control component 108 in one example signals an air compressor to inflate and/or deflate the air bladders 205. The air bladder 205 of FIG. 9 is inflated such that the rear subportion 110 is in the position 114. The air bladder 205 of FIG. 10 is deflated such that the rear subportion 110 is in a position 1002. In the position 1002, the angle 204 of the rear subportion 110 is approximately between ten to seventy degrees. The position 1002 provides less ischial support to the user than the position 114, as will be appreciated by those skilled in the art.

The seat 102, the backrest 104, and/or the leg support 106 in one example comprise viscoelastic foam. The foam comprises a soft upper layer on top of a firm lower layer to promote a damping of vibration of the user. The seat 102, the backrest 104, and/or the leg support 106 in one example comprise a fabric cover that promotes a reduction in shear forces between the user and the fabric cover, such as Rubatex® neoprene (RBX Industries, Inc., Roanoke, Va.

An illustrative description of exemplary operation of the apparatus 100 is presented, for explanatory purposes. Referring to FIG. 1, the rear subportion 110 is in the position 114. The backrest 104 is in the first shape 116 to provide support to the user. The position 114 and the first shape 116 comprise a first configuration. The user sits on the seat 102 and against the backrest 104.

Once the user is seated, the control component 108 in one example receives inputs from the input components 120 and causes one or more adjustments to one or more of the seat 102, the backrest 104, and/or the leg support 106 based on the inputs. The control component 108 in one example causes the adjustments to achieve a comfortable configuration and/or seating position for the user. In one example, the configuration promotes an even distribution of a contact pressure of the user against the seat 102 and the backrest 104. In another example, the configuration promotes a reduction in a peak contact pressure of the user against the seat 102 and the backrest 104. In yet another example, the configuration promotes a pre-determined ratio of contact pressures of the user.

The control component 108 adjusts one or more of the seat 102, the backrest 104, and/or the leg support 106 to a second configuration. The second configuration in one example comprises one or more of the positions 206, 304, 502, and/or 1002 of the rear subportion 110 and the shape 208 of the backrest 104. In a further example, the front subportion 112 tilts upward approximately zero to five degrees in the second configuration. The second configuration promotes a reduction in contact pressure of the ischial region of the user relative to the first configuration, as will be appreciated by those skilled in the art.

The control component 108 makes a determination of when to adjust between the first configuration and the second configuration. The control component 108 makes the determination based on one or more of the dermal temperature of the user against the seat 102 and/or backrest 104, the contact pressure of the user against the seat 102 and/or backrest 104, an end of a pre-determined time interval, acceleration of the seat 102 and/or backrest 104, and/or an input from the user.

In one example, the control component 108 employs the input components 120 to monitor the dermal temperature of the user. The input components 120 measure one or more of a peak dermal temperature and/or an average dermal temperature of the user. After a period of time sitting against the seat 102 and/or backrest 104, the dermal temperature of the user increases. Once the dermal temperature of the user reaches a pre-determined level, the control component 108 adjusts the seat 102 and/or the backrest 104 between the first and second configuration, as will be appreciated by those skilled in the art.

In another example, the control component 108 employs the input components 120 to monitor the contact pressure of the user. The input components 120 measure one or more of a peak pressure and/or an average pressure of the user. After a period of time sitting against the seat 102 and/or backrest 104, the user may become restless and fidget, causing changes in the contact pressure on the seat 102 and/or the backrest 104. The control component 108 monitors changes in pressure and adjusts the seat 102 and/or the backrest 104 between the first and second configuration when the user fidgets. For example, if the user makes several adjustments in seating position in a short time period, indicating discomfort, the control component 108 adjusts between the first and second configuration, as will be appreciated by those skilled in the art.

In yet another example, the control component 108 employ the input components 120 to determine an end of a pre-determined time interval. For example, the control component 108 employs a clock input to adjust between the first and second configuration every T minutes, where T is between five and twenty minutes. In a further example, the control component 108 employs one or more manual inputs from the user to adjust between the first and second configurations. For example, the user presses a button or switch (not shown) to cause the adjustment between the first and second configurations. The user may also adjust individual components of the seat 102, the backrest 104, and/or the leg support 106 through employment of the button or switch.

The control component 108 in one example adjusts the seat 102, the backrest 104, and/or the leg support 106 in a pre-determined sequence. In one example for an adjustment from the first configuration to the second configuration, the control component 108 first adjusts the backrest from the shape 116 to the shape 208. The control component 108 then adjusts the rear subportion 110 from the position 114 to one or more of the positions 206, 304, 502, and/or 1002. In another example for an adjustment from the second configuration to the first configuration, the control component 108 first adjusts the rear subportion 110 from one or more of the positions 206, 304, 502, and/or 1002 to the position 114. The control component 108 then adjusts the backrest 104 from the shape 208 to the shape 116.

Adjustments of the seat 102, the backrest 104, and/or the leg support 106 in one example occur over a pre-determined time interval. For example, the control component 108 gradually adjusts the backrest 104 from the shape 116 to the shape 208 over a time interval of ten seconds. The control component 108 in one example causes adjustments of the seat 102, the backrest 104, and/or the leg support 106 concurrently. For example, the control component 108 starts an adjustment of the backrest 104 and, before completion of the adjustment of the backrest 104, starts an adjustment of the leg support 106, as will be appreciated by those skilled in the art.

The apparatus 100 in one example comprises a plurality of components such as one or more of electronic components, hardware components, and computer software components. A number of such components can be combined or divided in the apparatus 100. An exemplary component of the apparatus 100 employs and/or comprises a set and/or series of computer instructions written in or implemented with any of a number of programming languages, as will be appreciated by those skilled in the art. The apparatus 100 in one example comprises any (e.g., horizontal, oblique, or vertical) orientation, with the description and figures herein illustrating one exemplary orientation of the apparatus 100, for explanatory purposes.

The apparatus 100 in one example employs one or more computer-readable signal-bearing media. The computer-readable signal-bearing media store software, firmware and/or assembly language for performing one or more portions of one or more embodiments of the invention. An exemplary computer-readable signal-bearing medium for the apparatus 100 comprises the recordable data storage medium 122 of the control component 108. The computer-readable signal-bearing medium for the apparatus 100 in one example comprise one or more of a magnetic, electrical, optical, biological, and atomic data storage medium. For example, the computer-readable signal-bearing medium comprise floppy disks, magnetic tapes, CD-ROMs, DVD-ROMs, hard disk drives, and electronic memory. In another example, the computer-readable signal-bearing medium comprises a modulated carrier signal transmitted over a network comprising or coupled with the apparatus 100, for instance, one or more of a telephone network, a direct connection via serial or parallel cable, a local area network ("LAN"), a wide area network ("WAN"), the Internet, and a wireless network.

The steps or operations described herein are just exemplary. There may be many variations to these steps or operations without departing from the spirit of the invention. For instance, the steps may be performed in a differing order, or steps may be added, deleted, or modified.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

What is claimed is:

1. An apparatus, comprising:
    a seat that comprises a front subportion and a rear subportion that is adjustable in height and/or angle relative to the front subportion;
    a backrest that is adjustable in shape; and
    a controller communicatively coupled with the seat, the backrest, and one or more input components that comprise one or more contact pressure sensors and one or more air pressure sensors;
    wherein one or more of the one or more contact pressure sensors measure a user contact pressure against one or more portions of the seat and/or one or more portions of the backrest;
    wherein one or more of the one or more air pressure sensor measures an air pressure within one or more air bladders under the rear subportion of the seat and an air pressure within one or more air bladders embedded in a lumbar region of the one or more portions of the backrest;
    wherein, based on the user contact pressure against one or more portions of the seat and/or one or more portions of the backrest, the air pressure within the one or more air bladders under the rear subportion of the seat, and the air pressure within the one or more air bladders embedded in the lumbar region of the one or more portions of the backrest as feedback signals to the controller, the rear subportion of the seat and the backrest are actively adjustable based on a command from the controller between:
        a first height and/or angle of the rear subportion of the seat and a first shape of the backrest; and
        a second height and/or angle of the rear subportion of the seat and a second shape of the backrest.

2. The apparatus of claim 1, wherein the first height and/or angle of the rear subportion of the seat and a corresponding height and/or angle of the front subportion of the seat comprise a substantially same height and/or angle;
    wherein the second height and/or angle of the rear subportion of the seat is/are less than the corresponding height and/or angle of the front subportion of the seat.

3. The apparatus of claim 2, wherein, based on the user contact pressure against the one or more portions of the seat and/or the one or more portions of the backrest, the air pressure within the one or more air bladders under the rear subportion of the seat, and the air pressure within the one or more air bladders embedded in the lumbar region of the one or more portions of the backrest as the feedback signals to the controller, the rear subportion of the seat is actively, pivotally adjustable with respect to an axis formed between the front subportion of the seat and the rear subportion of the seat and based on the command from the controller between:

the first angle of the rear subportion of the seat; and
the second angle of the rear subportion of the seat;
wherein, based on the user contact pressure against the one or more portions of the seat and/or the one or more portions of the backrest, the backrest is actively adjustable based on the command from the controller between:
the first shape of the backrest; and
the second shape of the backrest.

4. The apparatus of claim 2, wherein the one or more air bladders under the rear subportion of the seat comprises one or more triangular prism shaped air bladders that are inflatable and deflatable to actively adjust based on the command from the controller between:
the first height and/or angle of the rear subportion of the seat; and
the second height and/or angle of the rear subportion of the seat.

5. The apparatus of claim 1, wherein relatively different sizes of the first and second shapes of the lumbar region of the one or more portions of the backrest serve to promote an increase in lumbar support for a user of the seat and backrest.

6. The apparatus of claim 1, wherein the one or more air bladders embedded in the lumbar region of the one or more portions of the backrest are inflatable and deflatable to actively adjust based on the measured air pressure within the one or more air bladders embedded in the lumbar region and activated by the command from controller between the first and second shapes of the backrest.

7. The apparatus of claim 6, wherein one or more of the seat and/or the backrest comprise one or more side bolsters that serve to provide lateral support to the user of the seat and/or backrest.

8. The apparatus of claim 1, wherein the first shape of the backrest comprises a first shape of the lumbar region of the one or more portions of the backrest, wherein the second shape of the backrest comprises a second shape of the lumbar region of the one or more portions of the backrest;
wherein the controller causes an active adjustment of the rear subportion of the seat and the lumbar region of the one or more portions of the backrest between:
the first height and/or angle of the rear subportion of the seat and the first shape of the lumbar region of the one or more portions of the backrest; and
the second height and/or angle of the rear subportion of the seat and the second shape of the lumbar region of the one or more portions of the backrest.

9. The apparatus of claim 8 in combination with the one or more input components, wherein the one or more input components comprise the one or more contact pressure sensors, the one or more air pressure sensors, one or temperature sensors, one or more accelerometers, and one or more clock inputs;
wherein the one or more contact pressure sensors, the one or more air pressure sensors, the one or more temperature sensors, the one or more accelerometers, and the one or more clock inputs are coupled with the seat and the backrest;
wherein the controller employs one or more of the one or more contact pressure sensors, the one or more air pressure sensors, the one or more temperature sensors, the one or more accelerometers, and the one or more clock inputs to cause the active adjustment of the rear subportion of the seat and/or the lumbar region of the one or more portions of the backrest between:
the first height and/or angle of the rear subportion of the seat and the first shape of the lumbar region of the one or more portions of the backrest; and
the second height and/or angle of the rear subportion of the seat and the second shape of the lumbar region of the one or more portions of the backrest.

10. The apparatus of claim 8, in combination with the one or more contact pressure sensors and the one or more air pressure sensors;
wherein the one or more of the one or more contact pressure sensors measure the user contact pressure against the seat and the backrest;
wherein the controller employs the user contact pressure against the seat and the backrest to determine any one or more of:
the first height and/or angle of the rear subportion of the seat;
the first shape of the lumbar region of the one or more portions of the backrest;
the second height and/or angle of the rear subportion of the seat; and/or the second shape of the lumbar region of the one or more portions of the backrest.

11. The apparatus of claim 8, wherein the one or more portions of the seat comprise the front subportion and the rear subportion of the seat, wherein the controller employs one or more ratios between any two of:
a user contact pressure against the rear subportion of the seat measured by the one or more contact pressure sensors;
a user contact pressure against the backrest measured by the one or more contact pressure sensors; and/or
a user contact pressure against the front subportion of the seat measured by the one or more contact pressure sensors;
wherein the controller employs the one or more ratios to determine one or more of:
the first height and/or angle of the rear subportion of the seat;
the first shape of the lumbar region of the one or more portions of the backrest;
the second height and/or angle of the rear subportion of the seat, and/or
the second shape of the lumbar region of the one or more portions of the backrest.

12. The apparatus of claim 8, in combination with the one or more input components, wherein the one or more input components comprise the one or more contact pressure sensors, the one or more air pressure sensors, and one or more temperature sensors;
wherein the controller determines a duration of time between adjustments based on one or more dermal temperatures of the user against the seat and/or the lumbar region of the one or more portions of the backrest measured by the one or more temperature sensors;
wherein the controller actively adjusts the seat and/or the lumbar region of the one or portion of the backrest upon an end of the duration of time between adjustments.

13. The apparatus of claim 8, wherein the controller makes a determination of an end of a pre-determined time interval;
wherein the controller actively adjusts the seat and/or the lumbar region of the one or more portions of the backrest upon the determination of the end of the pre-determined time interval.

14. The apparatus of claim 8, wherein the controller makes a determination of a duration of time that a measured contact pressure against all portions of the seat is within a relatively small range of zero based on all contact pressure sensors on the seat;

wherein the controller actively adjusts the rear portion of the seat to the first height and/or angle of the rear subportion of the seat and subsequently powers off the apparatus.

15. The apparatus of claim 1, further comprising:

a leg support that is adjustable in height and/or angle relative to the front subportion of the seat;

wherein the one or more of the one or more contact pressure sensors measure the user contact pressure against the one or more portions of the seat and a user contact pressure against the lumbar region of the one or more portions of the backrest and a user contact pressure against one or more portions of the leg support;

wherein, based on the user contact pressure against the one or more portions of the seat and the user contact pressure against the lumbar region of the one or more portions of the backrest and the user contact pressure against one or more portions of the leg support, the leg support is actively adjustable based on the command from the controller between:

a first height and/or angle of the leg support that serves to support a knee of a user at a first angle;

a second height and/or angle of the leg support that serves to support the knee of the user at a second angle that is less than the first angle.

16. The apparatus of claim 1, wherein the seat and the backrest comprise one or more portions of a chair, wheelchair, and/or car seat.

17. The apparatus of claim 1, wherein one or more portions of the seat and/or the backrest comprise a layer of a softer viscoelastic foam atop a layer of harder viscoelastic foam that promote a reduction in whole body vibration of a user of the seat and/or backrest and contact comfort to the user;

wherein one or more of the seat and/or backrest comprise a neoprene fabric as a cover material that promotes a reduction in shear force between the user and the seat and/or backrest.

18. The apparatus of claim 1, wherein the backrest comprises four or more suspension components that allow the lumbar region of the one or more portions of the backrest to oscillate in one or more directions to promote a reduction in movement of a user of the seat and/or backrest relative to the backrest.

19. A method, comprising the steps of:

adjusting a lumbar region of a backrest between a first shape and a second shape based on a user contact pressure, measured by one or more contact pressure sensors, against the lumbar region of the backrest and/or one or more portions of a seat through employment of a controller, wherein the controller is communicatively coupled with the seat, the backrest, and the one or more contact pressure sensors; and adjusting a rear subportion of the seat between a first height and/or angle and a second height and/or angle relative to a front subportion of the seat based on the user contact pressure, measured by the one or more contact pressure sensors, against the lumbar region of the backrest and/or the one or more portions of the seat through employment of the controller.

20. The method of claim 19, further comprising the steps of:

making a determination of an end of a pre-determined time interval; and adjusting the lumbar region of the backrest between the first shape and the second shape and adjusting the rear subportion of the seat between the first height and/or angle and the second height and/or angle upon the determination of the end of the pre-determined time interval through employment of the controller.

* * * * *